June 14, 1932.  A. F. MASURY  1,862,756
REFUSE DISPOSAL TRUCK
Original Filed May 29, 1930  3 Sheets-Sheet 2
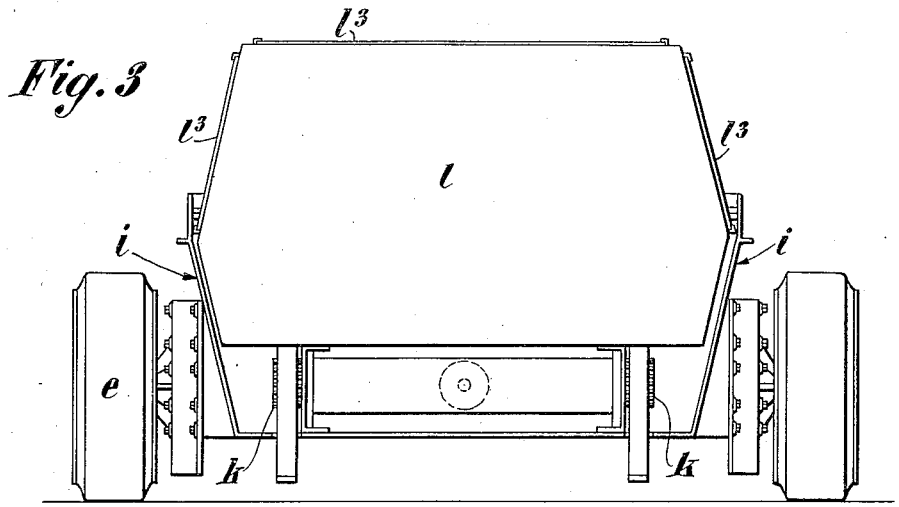
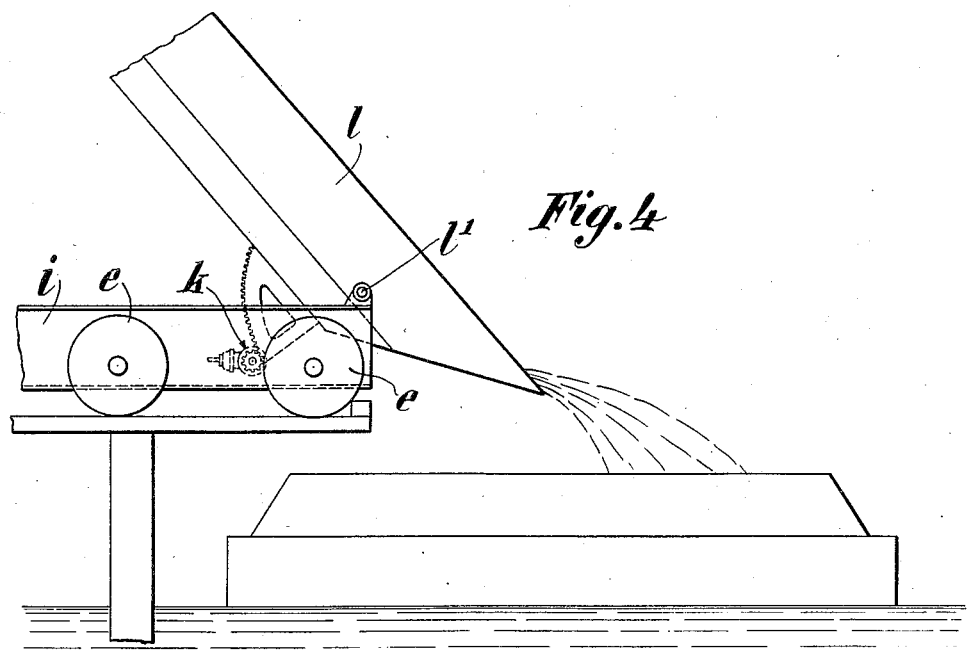
INVENTOR
Alfred F. Masury,
BY
HIS ATTORNEYS

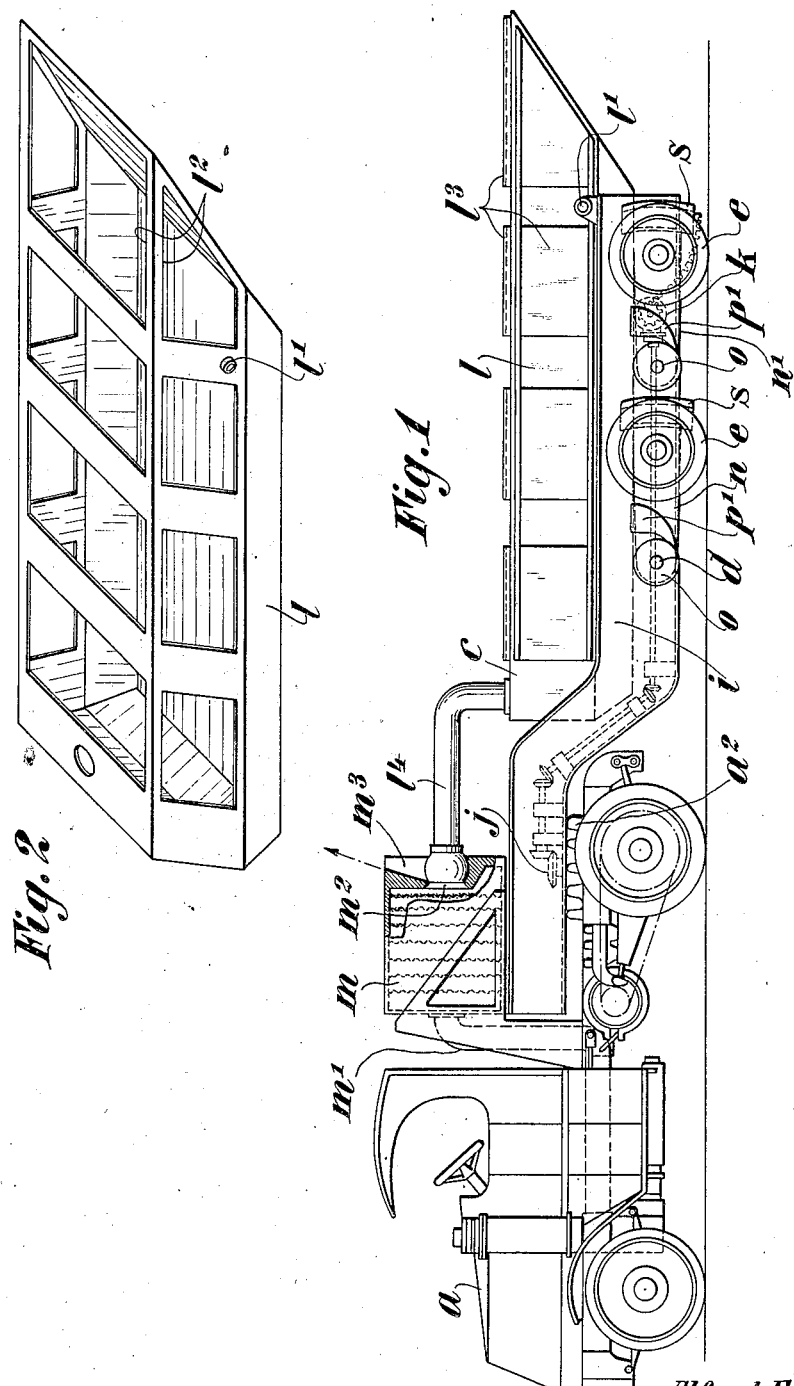

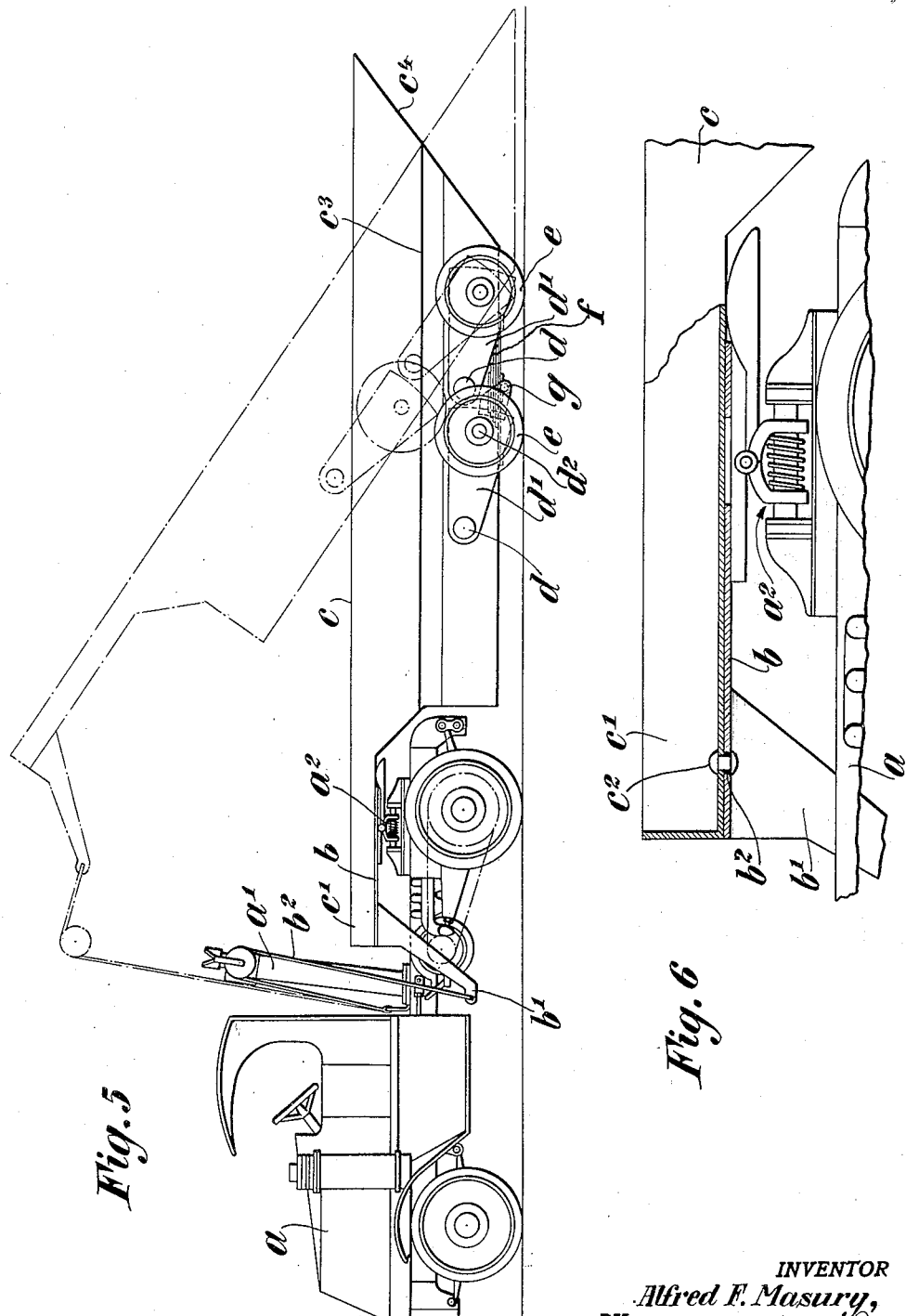

Patented June 14, 1932

1,862,756

UNITED STATES PATENT OFFICE

ALFRED F. MASURY, OF NEW YORK, N. Y., ASSIGNOR TO INTERNATIONAL MOTOR COMPANY, OF NEW YORK, N. Y., A CORPORATION OF DELAWARE

REFUSE DISPOSAL TRUCK

Original application filed May 29, 1930, Serial No. 456,938. Divided and this application filed June 22, 1931. Serial No. 545,967.

This application is a division of applicant's copending application Ser. No. 456,938 for refuse disposal truck, filed May 29, 1930.

The present invention relates to motor vehicles adapted particularly for the transportation and disposal of refuse, such as garbage, ashes, etc., and embodies more specifically, an improved vehicle by means of which the collection and disposal of the refuse is greatly facilitated.

One of the most important considerations in the design of vehicles for service of this character is that of providing a relatively low body in order that the refuse may be loaded therein readily. It is further necessary that the body be of such character that the contents may be readily transported and dumped, such characteristics being combined with those of simplicity of design and strength and efficiency in operation.

An object of the invention, accordingly, is to provide a vehicle of the above character by means of which refuse may be readily loaded therein and effectively transported and dumped.

A further object of the invention is to provide a device of the above character, the construction of which is comparatively simple and the operation of which is highly effective in service.

Further objects, not specifically enumerated above, will be apparent as the invention is described in greater detail in connection with the accompanying drawings, wherein:

Figure 1 is a view in side elevation, partly broken away and in section, showing one form of the invention.

Figure 2 is a perspective view, showing the body which is mounted for dumping upon the vehicle shown in Figure 1.

Figure 3 is a view in end elevation, showing the vehicle of Figure 1.

Figure 4 is a diagrammatic view, showing the manner in which the body of Figure 2 is dumped.

Figure 5 is a view in side elevation showing a modified form of vehicle.

Figure 6 is a detail view showing the manner of mounting the trailer body upon the tractor in the construction of Figure 5.

Referring particularly to Figures 5 and 6 of the above drawings, $a$ designates a tractor which is preferably of a standard and well known design, a hoisting mechanism $a'$ being provided thereon for hoisting the trailer body as described hereinafter.

A fifth wheel $a^2$ is provided on the tractor and mounts a plate $b$ pivoted thereon. This plate is provided with downwardly projecting arms $b'$, at either side of the vehicle, the arms having hoisting cables $b^2$ secured to the ends thereof, as clearly shown in Figure 1.

A body $c$ constituting a trailer is provided with a forwardly extending portion $c'$ which is secured to the plate $b$ for relative rotation therewith about the axis of the fifth wheel. A slot $b^2$ is preferably formed in the plate $b$ and receives a pin $c^2$, carried by the forwardly extending portion $c'$ of the body $c$, thus limiting the relative movement between the plate $b$ and forwardly extending portions $c'$.

Upon the opposite sides of the body $c$, rearwardly thereof, are mounted stud shafts $d$, there being two of such shafts upon either side of the body. These shafts journal radius rods $d'$, upon the outer ends of which wheels $e$ are journaled. Stud shafts $d^2$ are preferably provided for mounting the wheels $e$ upon the arms and a spring $f$ preferably transmits the weight of the body to the axles and wheels.

An intermediate stud shaft $g$, mounted between the shafts $d$, serves as an anchor tube for the spring $f$, the latter being journaled thereon intermediate its ends.

The foregoing construction provides an extremely low body for the trailer, the clearance thereof being designed in accordance with the various conditions under which the vehicle is to operate. If desired, the sides may be provided with outwardly extending flaring portions $c^3$ to facilitate loading of the vehicle, the rear of the body being formed with a sloping end $c^4$ to facilitate the dumping operation.

In the construction shown in Figures 1, 2, 3, and 4, the vehicle is provided with a trailer having relatively deep side frame members $i$ which are secured to the fifth wheel $a^2$. These frame members constitute a semi-trailer body upon which the wheels $e$ are mounted. Carried through the fifth wheel in any well known manner is a power take off shaft $j$ which transmits power rearwardly to a dumping mechanism $k$ carried upon the frame $i$. A body $l$ is pivoted upon the frame $l'$, this pivot being relatively high in order that the body may be elevated sufficiently in dumping.

As shown in Figure 2, the body is formed with a plurality of apertures $l^2$ over which sliding doors $l^3$ may be mounted in any well known manner.

Coaxial with the fifth wheel is a cleaner $m$ which is secured to the tractor and thus permits turning of the forward extremity of the frame $i$ with respect thereto. A suitable conduit $m'$ directs the flow of air from the cleaner to the engine cooling system which may be of any well known form. A conduit $l^4$ is secured to the body $l$ and is movable therewith. This conduit communicates with an aperture $m^2$ in the cleaner $m$, the connection therewith preferably being a ball joint to permit relative turning of the conduit with respect to the cleaner. In assuming the dumping angle, the conduit passes upwardly through a recess $m^3$ in the cleaner $m$, thus permitting the dumping of the body $l$ without obstructing the conduit.

It will thus be seen that the body $c$, cradles in the frame, is effectively ventilated by the conduits $l'$ and $l^4$, the cleaner $m$ serving to remove foreign particles from the air. The pivoting of the body upon the frame members $i$ being at a relatively high point, permits the effective dumping of the body without causing interference between the extreme end thereof and the ground.

From the foregoing, it will be seen that the body $c$ is admirably adapted for service such as the collection and dumping of refuse, etc., the construction being simple and of great strength to withstand the hard usage to which such vehicles are put. In the dumping operation, the body $c$ moves about the axis of the rear wheels, as clearly shown in dot and dash lines in Figure 1. In view of the fact that the forward of the rear wheels leave the ground during dumping, a stop lug $h$ is formed on the forward radius rods $d'$ to limit the movement of the wheels with respect to the body when the latter is dumped. While the invention has been described with specific reference to the accompanying drawings, it is not to be limited, save as defined in the appended claim.

I claim as my invention:

A tractor, a closed trailer body, a fifth wheel connection between the body and the tractor, means to elevate the body, a relatively stationary air cleaner, a conduit communicating between the cleaner and body, and a ball joint connecting means between the cleaner and conduit to permit turning of the conduit with respect to the cleaner, said cleaner being formed with a groove to permit the ball joint to be elevated with respect to the cleaner.

This specification signed this 19th day of June, A. D. 1931.

ALFRED F. MASURY.